(12) United States Patent
Otani

(10) Patent No.: US 10,259,326 B2
(45) Date of Patent: Apr. 16, 2019

(54) CAR CONTROL DEVICE

(71) Applicant: KABUSHIKI KAISHA TOSHIBA, Minato-ku (JP)

(72) Inventor: Hiroaki Otani, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 172 days.

(21) Appl. No.: 15/382,983

(22) Filed: Dec. 19, 2016

(65) Prior Publication Data

US 2017/0158057 A1   Jun. 8, 2017

Related U.S. Application Data

(63) Continuation of application No. PCT/JP2015/050848, filed on Jan. 14, 2015.

(30) Foreign Application Priority Data

Jun. 20, 2014   (JP) .................................. 2014-127755

(51) Int. Cl.
B60L 3/00 (2006.01)
H02P 27/06 (2006.01)
(Continued)

(52) U.S. Cl.
CPC .............. B60L 3/0023 (2013.01); B60L 3/00 (2013.01); B60L 3/0038 (2013.01); B60L 5/18 (2013.01);
(Continued)

(58) Field of Classification Search
CPC ........ B60L 3/0023; B60L 9/30; B60L 3/0038; B60L 5/18; B60L 3/00; B60L 9/24;
(Continued)

(56) References Cited

U.S. PATENT DOCUMENTS

| 4,385,336 A | * | 5/1983 | Takeshita | ............ H04M 19/001 |
| | | | | 361/42 |
| 2004/0066200 A1 | * | 4/2004 | Fujioka | ................ G01R 31/343 |
| | | | | 324/522 |

(Continued)

FOREIGN PATENT DOCUMENTS

| EP | 0 761 492 A1 | 3/1997 |
| JP | 10-164855 | 6/1998 |
| JP | 11-299086 A | 10/1999 |
| JP | 2000-308361 | 11/2000 |
| JP | 2004-132937 A | 4/2004 |
| JP | 2005253232 A * | 9/2005 |
| JP | 2006-304456 | 11/2006 |

(Continued)

OTHER PUBLICATIONS

International Search Report dated Apr. 21, 2015 in PCT/JP2015/050848 filed on Jan. 14, 2015.

*Primary Examiner* — Rodney A Butler
(74) *Attorney, Agent, or Firm* — Oblon, McClelland, Maier & Neustadt, L.L.P.

(57) ABSTRACT

A car control device according to an embodiment includes a converter and an inverter, a first contactor disposed between the transformer and the converter, a second contactor and a resistor connected in series with each other and in parallel with the first contactor, a first voltage detector and a second voltage detector disposed between the converter and the inverter, and a control unit. After the second contactor is closed and before the first contactor is closed, the control unit calculates a voltage difference between a first voltage value detected by the first voltage detector and a second voltage value detected by the second voltage detector, compares the calculated voltage difference with a predefined threshold value, and determines that at least one of the first voltage detector and the second voltage detector malfunctions when the voltage difference is greater than the threshold value.

4 Claims, 6 Drawing Sheets

(51) Int. Cl.
    *H02M 7/48*     (2007.01)
    *B60L 9/30*     (2006.01)
    *B60L 9/24*     (2006.01)
    *B60L 5/18*     (2006.01)

(52) U.S. Cl.
    CPC ............... *B60L 9/24* (2013.01); *B60L 9/30* (2013.01); *H02M 7/48* (2013.01); *H02P 27/06* (2013.01); *B60L 2200/26* (2013.01); *B60L 2210/40* (2013.01); *B60L 2240/527* (2013.01); *B60L 2240/529* (2013.01)

(58) Field of Classification Search
    CPC .......... B60L 2200/26; B60L 2240/529; B60L 2210/40; B60L 2240/527; H02M 7/48; H02P 27/06
    See application file for complete search history.

(56) References Cited

U.S. PATENT DOCUMENTS

| | | | |
|---|---|---|---|
| 2008/0004760 A1* | 1/2008 | Sogihara | B60L 3/0076 701/22 |
| 2010/0191399 A1* | 7/2010 | Kono | B60L 3/12 701/22 |
| 2010/0194322 A1* | 8/2010 | Negoro | B60L 3/003 318/454 |
| 2013/0003429 A1* | 1/2013 | Murahashi | B60L 3/0046 363/56.01 |
| 2015/0191086 A1* | 7/2015 | Sugahara | B60L 3/00 307/10.1 |

FOREIGN PATENT DOCUMENTS

| | | |
|---|---|---|
| JP | 2006-311692 | 11/2006 |
| JP | 2006-311692 A | 11/2006 |
| JP | 2010-273455 A | 12/2010 |

\* cited by examiner

CAR CONTROL DEVICE

CROSS-REFERENCE TO RELATED APPLICATIONS

This application is a Continuation of PCT/JP2015/050848, which was filed on Jan. 14, 2015. This application is based upon and claims the benefit of priority to Japanese Application No. 2014-127755, which was filed on Jun. 20, 2014.

FIELD

Embodiments described herein relate generally to car control devices mainly used for railroad cars.

BACKGROUND

Railroad cars generally use DC power or AC power supplied from overhead electric lines to obtain electric power for driving their motors. The electric power is generated by a power conversion device installed in the railroad cars as well.

The DC power or the AC power supplied from the overhead electric lines is received by a pantograph, and then supplied to the motor via various electric circuits such as a transformer and the power conversion device. The electric circuits have sensors such as a voltage detector and a current detector, which, for example, are used to monitor whether any malfunction such as a short-circuit occurs in the electric circuits. The sensors are also used by the power conversion device to generate the electric power for driving the motor.

Patent Document 1:JP-A-2010-273455

SUMMARY OF THE INVENTION

Technical Problem

In the case where the state of an electric circuit is obtained by using sensors as described above, the normal operation of the sensors is a precondition. Therefore, a dedicated circuit or a test mode for inspecting whether the sensors are malfunctioning is provided. However, the dedicated circuit provided for the inspection purpose leads to an increase in size of the device. On the other hand, the test mode requires a set state or environment for carrying out the test mode.

In consideration of the above circumstances, it is an object of the present invention to provide a car control device capable of inspecting whether sensors are malfunctioning without using a dedicated circuit or a test mode.

Solution to Problem

A car control device according to an embodiment includes: a converter and an inverter configured to convert power, which is received by a pantograph and supplied to the converter and the inverter via a transformer, to power for driving a motor; a first contactor disposed between the transformer and the converter, and a second contactor and a resistor connected in series with each other and in parallel to the first contactor; a first voltage detector and a second voltage detector disposed between the converter and the inverter; and a control unit, the control unit, after controlling the second contactor to be closed and before controlling the first contactor to be closed, calculating a voltage difference between a first voltage value detected by the first voltage detector and a second voltage value detected by the second voltage detector; comparing the voltage difference calculated and a predefined threshold value; and determining that at least one of the first voltage detector and the second voltage detector malfunctions when the voltage difference is greater than the threshold value as a result of the comparison.

DETAILED DESCRIPTION

Hereinafter, car control devices according to embodiments will be described with reference to the accompanying drawings.

Figure 1:
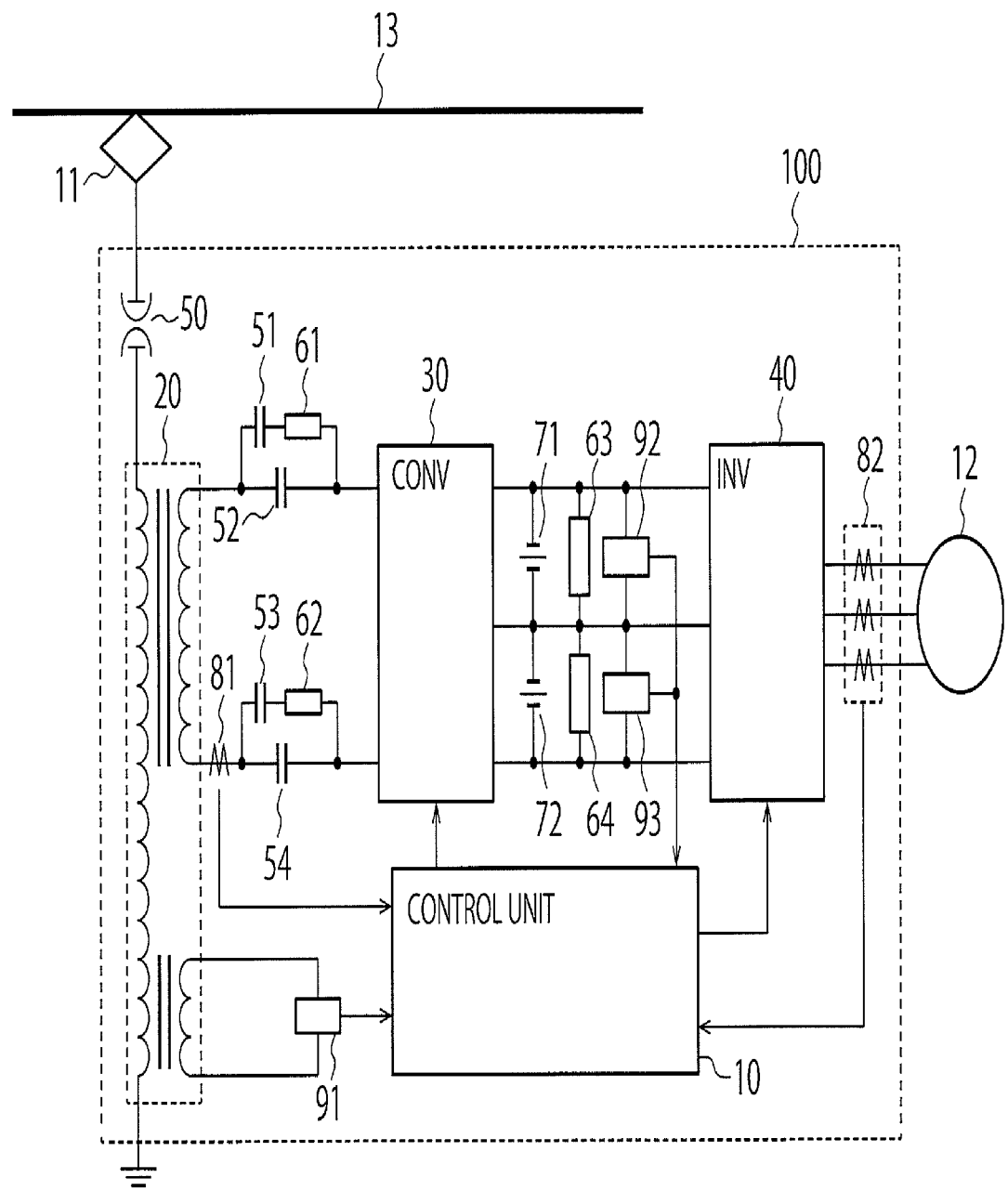
FIG. 1 is a diagram showing a schematic configuration of a car control device according to embodiments.

FIG. 1 shows a schematic configuration of a car control device 100 installed in a railroad car. The car control device 100 includes, as man elements, a control unit 10 having a function to control devices such as a power conversion device and to inspect malfunctions of sensors, a transformer 20 configured to reduce in voltage AC power supplied from an overhead electric line 13 via a pantograph 11, a converter 30 configured to convert the AC power reduced in voltage by the transformer 20 to DC power, and an inverter 40 configured to convert the DC power converted by the converter 30 to three-phase AC power for driving a motor 12.

The car control device 100 also includes a circuit breaker configured to prevent the AC power received via the pantograph 11 from being inputted to a primary coil of the transformer 20, contactors 51 to 54, charge resistors 61 and 62, and a current detector 81 disposed between a secondary coil of the transformer 20 and the converter 30, voltage-dividing capacitors 71 and 72, discharge resistors 63 and 64, and voltage detectors 92 and 93 disposed between the converter 30 and the inverter 40, and a current detector 82 disposed between the inverter 40 and the motor 12. The voltage-dividing capacitors 71 and 72 are connected in series to each other, and the voltage detectors 92 and 93 are connected in series to each other. Furthermore, the voltage detector 92 and the voltage-dividing capacitor 71 are connected in parallel to each other between a positive electrode and a neutral point of a DC circuit between the converter 30 and the inverter 40, and the voltage-dividing capacitor 72 and the voltage detector 92 are connected in parallel to each other between a negative electrode and the neutral point of the DC circuit.

A voltage detector 91 is connected to a tertiary coil of the transformer 20.

First Embodiment

Figure 2:
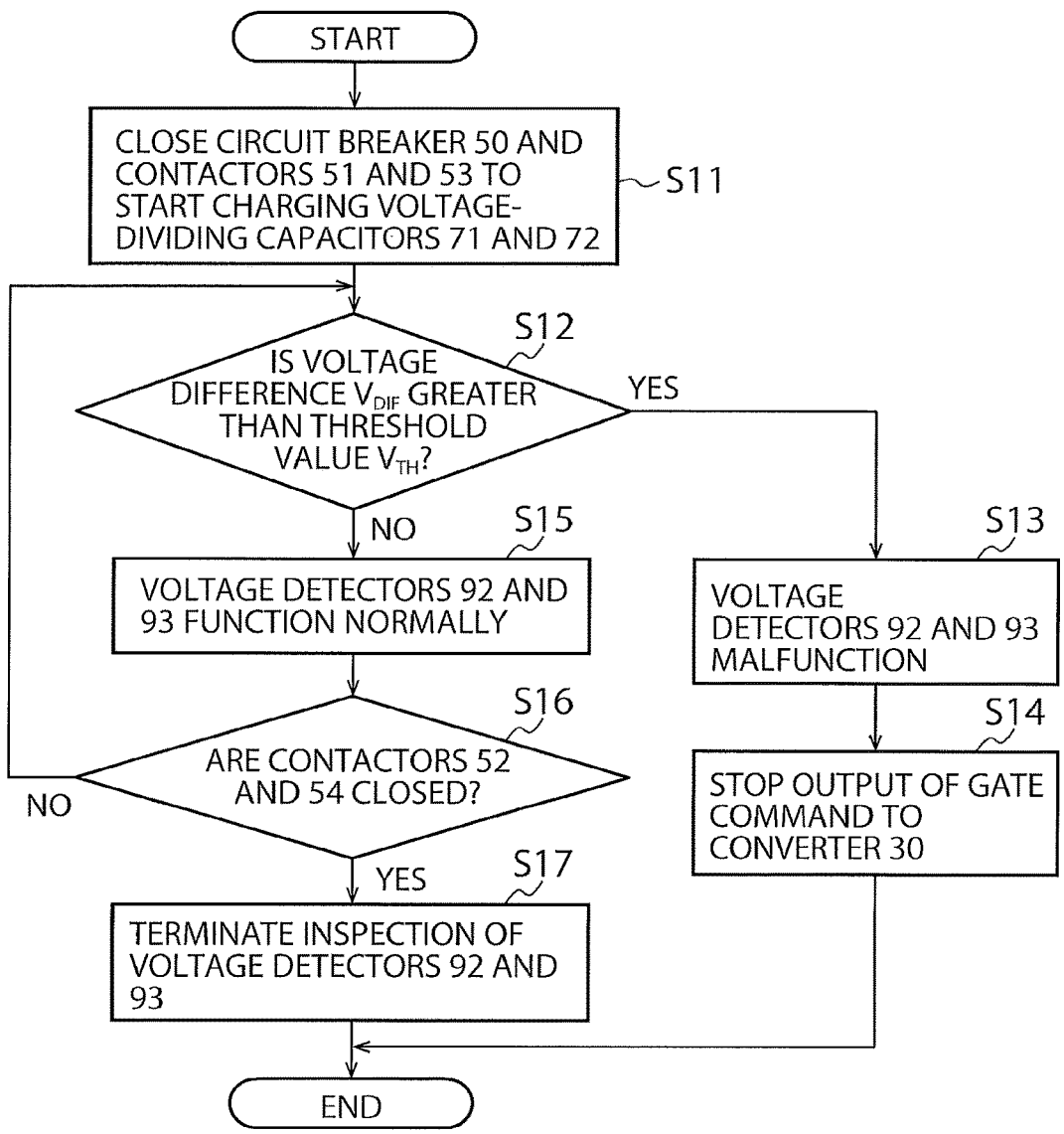
FIG. 2 is a diagram showing a process of determining a state of a voltage detector according to a first embodiment.

An operation for inspecting the voltage detectors 92 and 93 performed in the car control device 100 having the above configuration will be described with reference to FIGS. 1 and 2.

First, when a start-up switch mounted on a driver's platform is turned on, the control unit 10 receives a start-up command. In response to the reception of the start-up command, the control unit 10 closes the circuit breaker 50 and the contactors 51 and 53 in order to charge the voltage-dividing capacitors 71 and 72 (step S11). As a result, the AC power received by the pantograph 11 from the overhead electric line 13 is reduced in voltage by the transformer 20, and supplied to the converter 30. The AC power inputted from the transformer 20 to the converter 30 is converted to DC power, and supplied to the voltage-dividing capacitors 71 and 72.

The AC power that is reduced in voltage by the transformer 20 is supplied to the converter 30 via the charge resistors 61 and 62, the charge resistor 61 being connected in series with the contactor 51, and the charge resistor 62 being connected in series with the contactor 53. Therefore, the voltage-dividing capacitors 71 and 72 gradually store energy (electric charge). While the voltage-dividing capacitors 71 and 72 are being charged, all the switching devices are in the off state since no gate command is outputted from the control unit 10 to the converter 30 and the inverter 40.

After the charging of the voltage-dividing capacitors 71 and 72 starts, i.e., after the circuit breaker 50 and the contactors 51 and 53 are controlled to be closed, a voltage difference $V_{dif}$ between a voltage value $V_P$ inputted from the voltage detector 92 and a voltage value $V_N$ inputted from the voltage detector 93 is obtained, and the voltage difference $V_{dif}$ is compared with a predefined threshold value $V_{th}$ (step S12). The threshold value $V_{th}$ is preferably set in consideration of errors in resistance value of the discharge resistors 63 and 64 and errors in detection value of the voltage detectors. The voltage values $V_P$ and $V_N$ represent voltage values of voltages obtained by dividing an output voltage outputted from the converter 30 to the DC side, namely the inverter 40 side, by the voltage-dividing capacitors 71 and 72.

As a result of the comparison, if the voltage difference $V_{dif}$ is detected to be greater than the threshold value $V_{th}$ (YES in step S12), the control unit 10 determines that at least one of the voltage values detected by the voltage detectors 92 and 93 is incorrect, or at least one of the voltage detectors 92 and 93 malfunctions (step S13). Even if both the voltage detectors 92 and 93 function normally, the detected voltage values may vary due to the influence of noise or the like. Therefore, if the voltage difference $V_{dif}$ is instantaneously detected to be greater than the threshold value $V_{th}$, the detected value may not necessarily be determined to be "incorrect" or the voltage detectors may not necessarily be determined to "malfunction." Alternatively, the detected voltage values may be determined to be "incorrect" or the voltage detectors may be determined to "malfunction" only when the state in which the voltage difference $V_{dif}$ is greater than the threshold value $V_{th}$ continues for a predefined period of time.

If the control unit 10 determines that "the detected voltage values are incorrect" or "the voltage detectors malfunction," the control unit 10 does not output a gate signal to the converter 30, and stops the start-up operation of the car control device 100 (step S14).

On the other hand, if the value of the voltage difference $V_{dif}$ is not greater than the threshold value $V_{th}$, the control unit 10 determines that the voltage detectors 92 and 93 function normally (step S15).

The above-described process from step S12 to step S15 carried out by the control unit 10 is continued until the charging of the voltage-dividing capacitors 71 and 72 is completed. Specifically, the control unit 10 controls the contactors 52 and 54 to be closed when detecting that the voltage values $V_P$ and $V_N$ obtained from the voltage detectors 92 and 93 are predefined values, and that the charging of the voltage-dividing capacitors 71 and 72 is completed. Therefore, the above-described process is continued until the control unit 10 performs this control operation.

Therefore, if not performing the control operation for closing the contactors 52 and 54 (NO in step S16), the control unit 10 continues the process from step S12 to step S15. When performing the control operation for closing the contactors 52 and 54 (YES in step S16), the control unit 10 terminates the operation for inspecting the voltage detectors 92 and 93 (step S17).

As described above, according to the first embodiment, the voltage detectors 92 and 93 may be inspected after the car control device 100 is activated and during a normal operation. Therefore, there is no need for a dedicated circuit or a test mode for the inspection. Furthermore, since an inspection operation may be performed every time the car control device 100 is restarted during a normal operation, suspending the normal operation in order to perform the inspection is not needed.

The voltage detectors 92 and 93 are inspected only in a period from the time the circuit breaker 50 and the contactors 51 and 53 are closed to the time the contactors 52 and 54 are closed. The reason for this is that the inspection of the voltage detectors 92 and 93 may not be correctly performed after the contactors 52 and 54 are closed since the gate signal outputted from the control unit 10 to the converter 30 after the contactors 52 and 54 are closed may be regulated by the control unit 10 to be equally divided by the voltage-dividing capacitors 71 and 72 based on the voltage values $V_P$ and $V_N$ detected by the voltage detectors 92 and 93.

The inspection of the voltage detectors 92 and 93 may be performed by the time the control unit 10 outputs a gate signal to the converter 30 instead of the time the contactors 52 and 54 are closed.

In the above descriptions, if the voltage detectors 92 and 93 are determined to be malfunctioning, the control unit 10 does not output a gate command to the converter 30. However, the control unit 10 may output a gate command and may send a notice to a driver using an alarm lamp mounted on the driver's platform.

Second Embodiment

Figure 3:
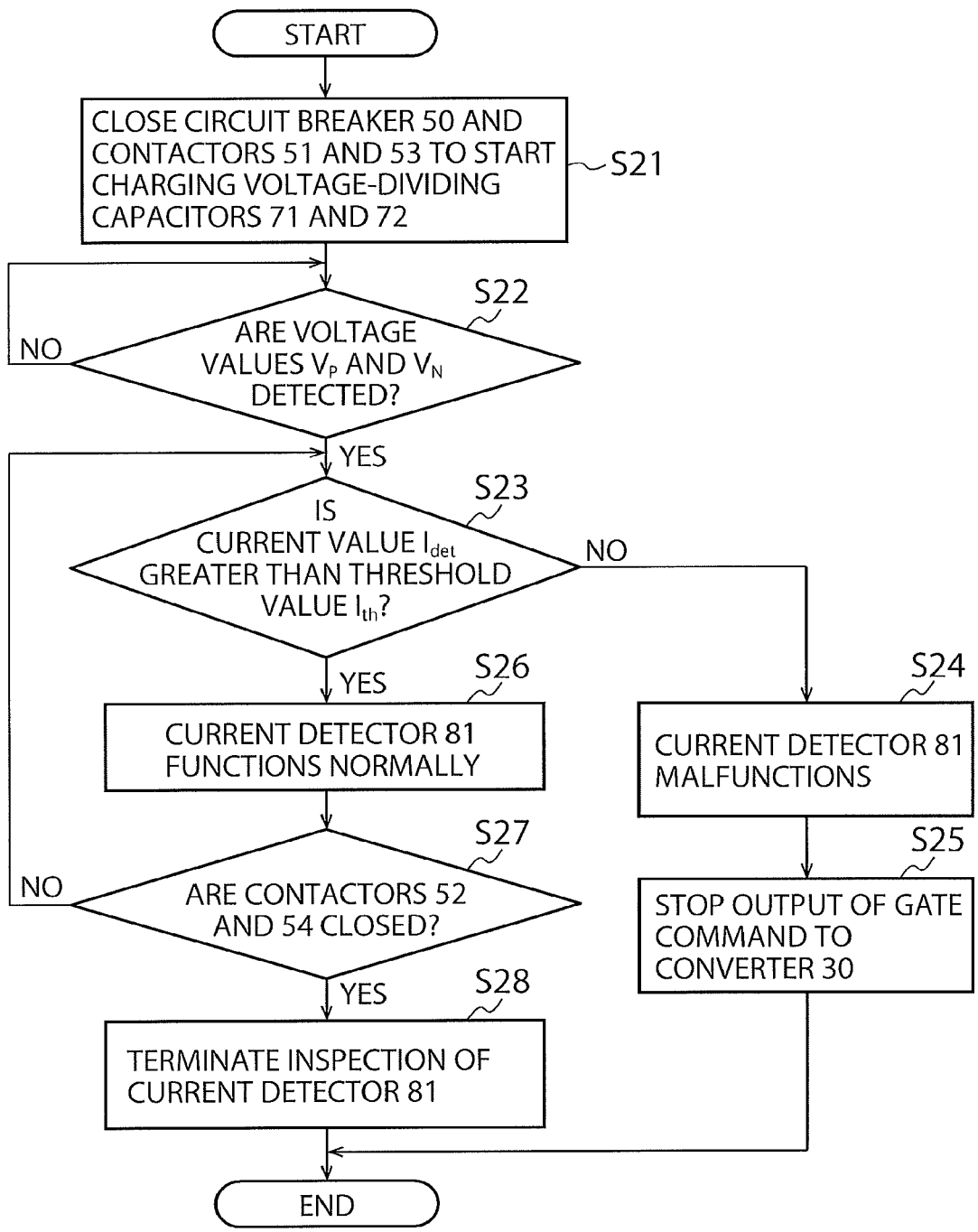
FIG. 3 is a diagram showing a process of determining a state of a current detector according to a second embodiment.

Next, an operation for inspecting the current detector 81 carried out in the car control device 100 will be described with reference to FIGS. 1 and 3.

First, as in the case of the first embodiment, when the start-up switch on the driver's platform is turned on, the control unit 10 receives a start-up command. In response to the start-up command, the control unit 10 closes the circuit breaker 50 and the contactors 51 and 53 in order to charge the voltage-dividing capacitors 71 and 72 (step S21). As a result, the AC power received by the pantograph 11 from the overhead electric line 13 is reduced in voltage by the transformer 20, and supplied to the converter 30. The AC power inputted from the transformer 20 to the converter 30 is converted to DC power, and supplied to the voltage-dividing capacitors 71 and 72.

After closing the circuit breaker 50 and the contactors 51 and 53, the control unit 10 determines whether the voltage value $V_P$ inputted from the voltage detector 92 and the voltage value $V_N$ inputted from the voltage detector 93 are greater than 0 (step S22). Instead of determining whether the voltage values $V_P$ and $V_N$ are greater than 0 as in the above case, the control unit 10 may compare the values with a predefined threshold value $V_{th2}$ that is greater than 0, and may determine whether the values are greater than the threshold value $V_{th2}$.

If the voltage values $V_P$ and $V_N$ inputted from the voltage detectors 92 and 93 are 0 (NO in step S22), the control unit 10 does not carry out the inspection of the current detector 81, and wait until the voltage values $V_P$ and $V_N$ become greater than 0.

On the other hand, when determining that the voltage values $V_P$ and $V_N$ inputted from the voltage detectors 92 and 93 are greater than 0, the control unit 10 compares a current value $I_{det}$ inputted from the current detector 81 with a predefined threshold value $I_{th}$ (step S23). This is performed in consideration of the fact that when the charging of the voltage-dividing capacitors 71 and 72 starts and voltage values that are greater than 0 are detected by the voltage detectors 92 and 93, an alternating current should flow on the transformer 20 side of the converter 30. The threshold value $I_{th}$ is preferably set in consideration of detection errors of the current detector.

As a result of the comparison, if the current value $I_{det}$ is not detected to be greater than the threshold value $I_{th}$ (NO in step S23), the control unit 10 determines that the current detector 81 malfunctions (step S24). Even if the current detector 81 is functioning normally, the detected current value may vary due to the influence of noise or the like. Therefore, if the voltage difference $V_{dif}$ is instantaneously detected to be equal to or less than the threshold value $V_{th}$, the current detector may not necessarily be determined to be malfunctioning, but may be determined to be malfunctioning only when the current value $I_{det}$ continues to be equal to or lower than the threshold value $I_{th}$ for a predefined period of time.

Determining that the current detector malfunctions, the control unit 10 does not output a gate signal to the converter 30, and stops the start-up operation of the car control device 100 (step S25).

On the other hand, if the current value $I_{det}$ is greater than the threshold value $I_{th}$ (YES in step S26), the control unit 10 determines that the current detector 81 functions normally (step S26).

The process from step S23 to step S26 carried out by the control unit 10 is continued until the charging of the voltage-dividing capacitors 71 and 72 is completed. The reason for this is that when the voltage values $V_P$ and $V_N$ obtained from the voltage detectors 92 and 93 have predefined values and the charging is completed, no alternating current flows through the transformer 20.

Therefore, if not performing the control operation for closing the contactors 52 and 54 (NO in step S27), the control unit 10 continues the process from step S23 to step S26, and if performing the control operation for closing the contactors 52 and 54 (YES in step S26), the control unit 10 suspends the inspection operation of the current detector 81 (step S28).

As described above, according to the second embodiment, the current detector 81 may be inspected after the car control device 100 is activated and during a normal operation. Therefore, there is no need for a dedicated circuit or a test mode for the inspection. Furthermore, since an inspection operation may be performed every time the car control device 100 is restarted during a normal operation, suspending the normal operation in order to perform the inspection is not needed.

In the above descriptions, if the current detector 81 is determined to be malfunctioning, the control unit 10 does not output a gate command to the converter 30. However, the control unit 10 may output a gate command and may send a notice to a driver using an alarm lamp mounted on the driver's platform.

Third Embodiment

Figure 4:
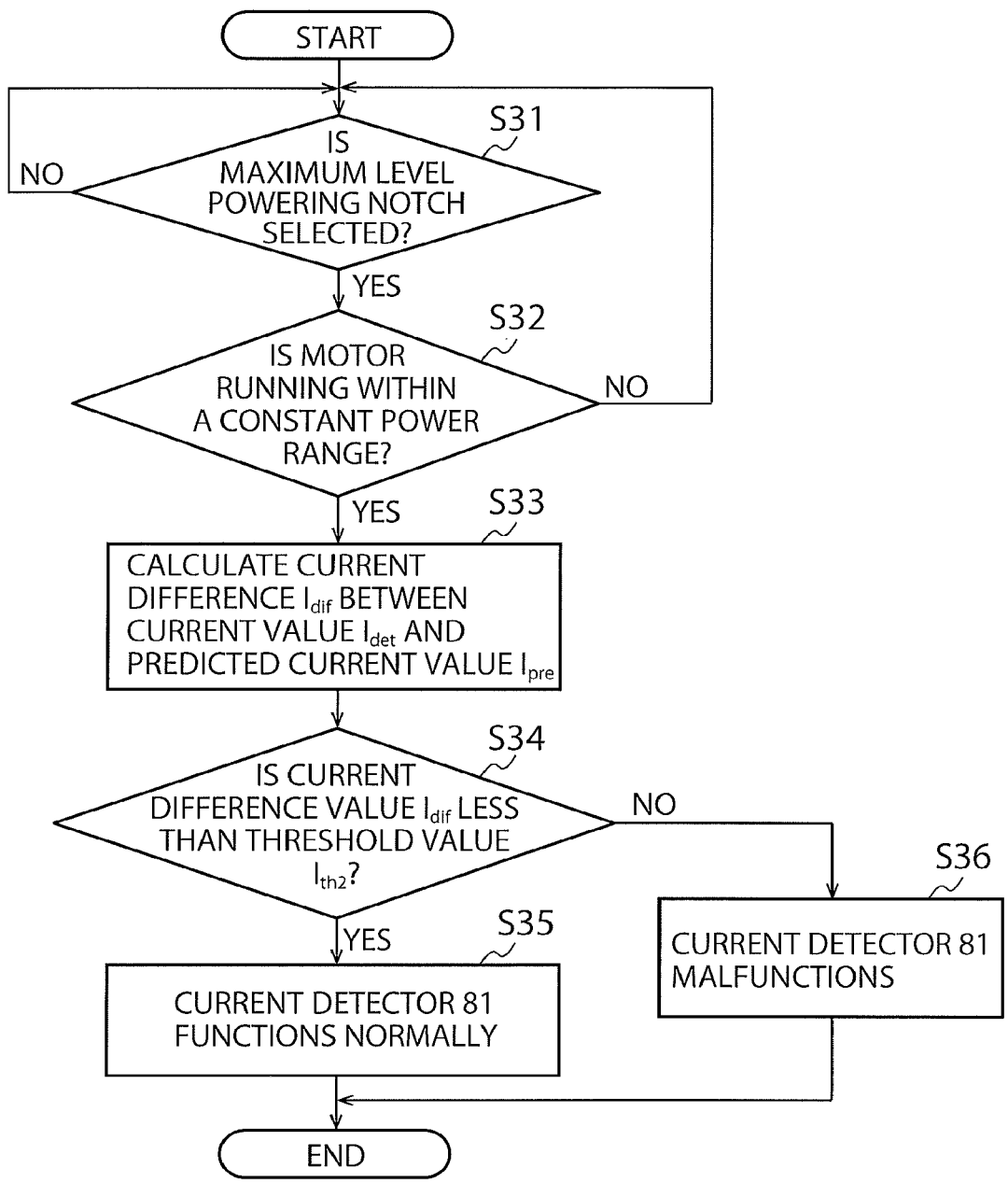
FIG. 4 is a diagram showing a process of determining a state of a current detector according to a third embodiment.
Figure 5:
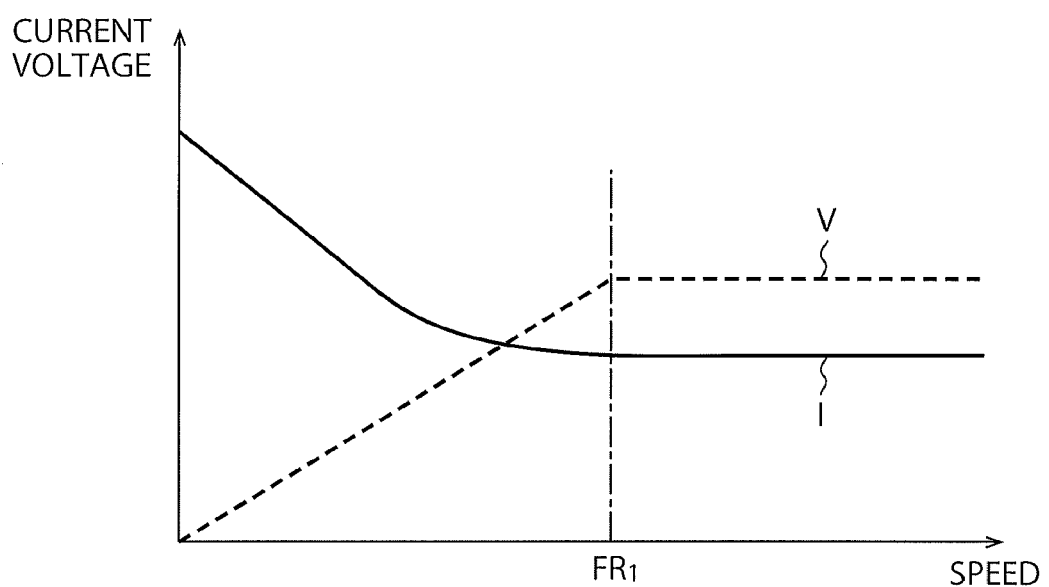
FIG. 5 is a diagram showing a relationship between motor rotational speed and current and voltage outputted by an inverter.

Next, another inspection operation for inspecting the current detector 81 carried out in the car control device 100 will be described with reference to FIGS. 1, 4, and 5.

The third embodiment relates to an inspection of the current detector 81 performed by the control unit 10 when, after the charging of the voltage-dividing capacitors 71 and 72 is completed, the control unit 10 outputs a gate signal to the converter 30 and the inverter 40 to drive the motor 12.

The control unit 10 is notified of information on a powering notch and a braking notch selected by a master controller mounted on the driver's platform. Therefore, the control unit 10 checks whether a maximum level notch is selected for the powering notch (step S31).

If, as a result of the checking, the maximum level powering notch is not selected (NO in step S31), the control unit 10 does not performed the inspection of the current detector 81.

On the other hand, if the selection of the maximum level powering notch is confirmed (YES in step S31), the control unit 10 checks whether the rotational speed of the motor 12 calculated based on a current value detected by the current detector 82 is within a constant power range (step S32).

Here, the constant power range is explained. FIG. 5 shows the relationship between the current value I and the voltage value V outputted from the inverter 40 when the powering notch is at the maximum level and the rotational speed of the motor 12. As the rotational speed of the motor 12 increases, the current value I decreases and the voltage value V increases. However, after the rotational speed of the motor 12 reaches $FR_1$, the current value I and the voltage value V remain at constant values even if the rotational speed increases. The rotational speed range in which the current value I and the voltage value V are at constant values is the constant power range.

If the rotational speed of the motor 12 is not within the constant power range (NO in step S32), i.e., if the rotational speed of the motor 12 is less than $FR_1$, the control unit 10 does not perform the inspection of the current detector 81, and continues the checking operation in step S31 and step S32.

On the other hand, if the control unit 10 confirms that the rotational speed of the motor 12 is within the constant power range in step S32 (YES in step S32), the control unit 10 calculates a current difference $I_{dif}$ between a current value $I_{det}$ inputted from the current detector 81 and a predefined predicted current value $I_{pre}$ (step S33), and compares the calculated current difference $I_{dif}$ with a predefined threshold value $I_{th2}$ (step S34). The predicted current value $I_{pre}$ is calculated from a secondary rating current value and an actual voltage of the overhead electric line 13, the secondary rating current value being calculated from a set current value in the constant power range when the overhead electric line 13 has a rating overhead electric line voltage (the current value I when the rotational speed of the motor 12 is greater than $FR_1$ in FIG. 5).

As a result of the comparison in step S34, if the current difference $I_{dif}$ is less than the predefined threshold value $I_{th2}$ (YES in step S34), the control unit 10 determines that the current detector 81 functions normally (step S35).

On the other hand, if the current difference $I_{dif}$ is equal to or greater than the predefined threshold value $I_{th2}$ (NO in step S34), the control unit 10 determines that he current detector 81 malfunctions (step S36).

As described above, according to the third embodiment, the current detector 81 may be inspected after the car control device 100 is activated and during a normal operation. Therefore, there is no need for a dedicated circuit or a test mode for the inspection.

Furthermore, according to the third embodiment, if the current detector 81 is determined to be malfunctioning, the control unit 10 sends a notice to the driver using, for example, an alarm lamp mounted on the driver's platform, instead of stopping the converter 30 and the inverter 40.

Fourth Embodiment

Figure 6:
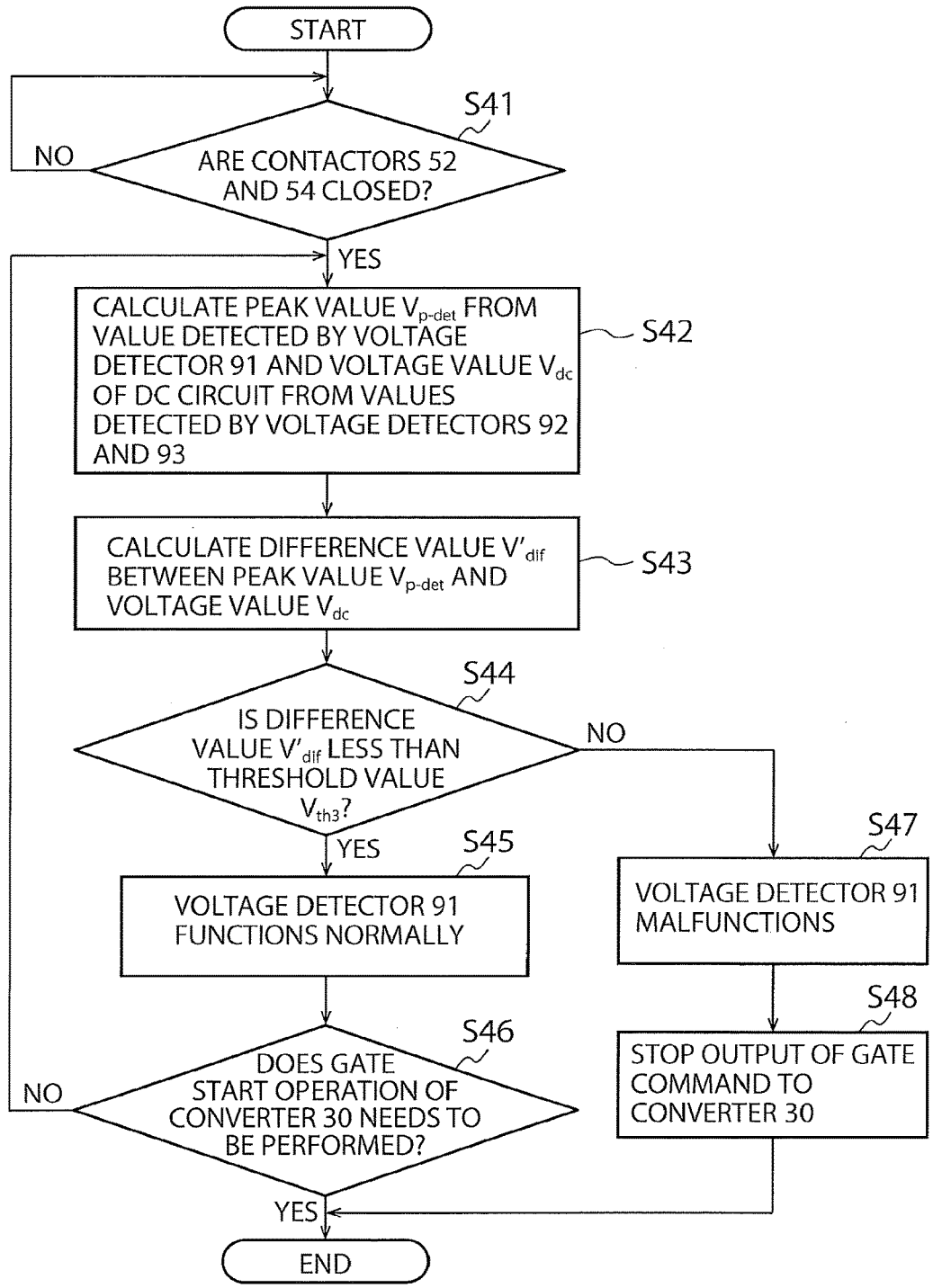
FIG. 6 is a diagram showing a process of determining a state of a voltage detector according to a fourth embodiment.

Next, an operation for inspecting the voltage detector 91 carried out in the car control device 100 will be described with reference to FIGS. 1 and 6.

The fourth embodiment relates to a process that is carried out after the charging of the voltage-dividing capacitors 71 and 72 as described in the descriptions of the first embodiment and the second embodiment is completed, and the contactors 52 and 54 are closed by the control unit 10. Therefore, the descriptions of the process before the contactors 52 and 54 are closed by the control unit 10 are omitted. The inspections of the voltage detectors 92 and 93 and the current detector 81 carried out in the first embodiment and the second embodiment are not necessarily performed in this embodiment.

After the charging of the voltage-dividing capacitors 71 and 72 is completed, the control unit 10 controls the contactors 52 and 54 to be closed, and then checks whether this control operation is performed (step S41). After the contactors 52 and 54 are closed (YES in step S41), the control unit 10 calculates a peak value $V_{p\text{-}det}$ of a voltage value $V_{det}$ detected by the voltage detector 91 connected to a tertiary coil of the transformer 20 and inputted to the control unit 10. Furthermore, the control unit 10 calculates a voltage value $V_{dc}$ of the DC circuit between the converter 30 and the inverter 40 by adding the voltage values $V_P$ and $V_N$ detected by the voltage detectors 92 and 93 and inputted to the control unit 10 (step S42).

The control unit 10 calculates a difference value $V'_{dif}$ between the calculated peak value $V_{p\text{-}det}$ and the voltage value $V_{dc}$ of the DC circuit (step S43).

After calculating the difference value $V'_{dif}$, the control unit 10 compares a predefined threshold value $V_{th3}$ with the difference value $V'_{dif}$ (step S44). If, as a result, the difference value $V'_{dif}$ is less than the threshold value $V_{th3}$ (YES in step S44), the control unit 10 determines that the voltage detector 91 functions normally (step S45). When determining that the voltage detector 91 functions normally, the control unit 10 determines whether a gate start operation of the converter 30 should be performed, i.e., whether a gate signal should be outputted to the converter 30 (step S46). If the gate signal should not be outputted (NO in step S46), the process returns to step S42, and the inspection of the voltage detector 91 continues.

On the other hand, if the difference value $V'_{dif}$ is equal to or more than the threshold value $V_{th3}$ (NO in step S44), the control unit 10 determines that the voltage detector 91 malfunctions (step S47), does not output a gate signal to the converter 30, and terminates the start-up operation of the car control device 100 (step S48).

As described above, according to the fourth embodiment, the voltage detector 91 may be inspected after the car control device 100 is activated and during a normal operation. Therefore, there is no need for a dedicated circuit or a test mode for the inspection. Furthermore, since an inspection operation may be performed every time the car control device 100 is restarted during a normal operation, suspending the normal operation in order to perform the inspection is not needed.

In the above descriptions, if the voltage detector 91 is determined to be malfunctioning, the control unit 10 does not output a gate command to the converter 30. However, the control unit 10 may output a gate command and may send a notice to a driver using an alarm lamp mounted on the driver's platform.

DESCRIPTION OF REFERENCE NUMERALS

10 . . . control unit
20 . . . transformer
30 . . . converter
40 . . . inverter
50 . . . circuit breaker
61, 62, 63, 64 . . . resistor
71, 72 . . . voltage-dividing capacitor
81, 82 . . . current detector
91, 92, 93 . . . voltage detector
100 . . . car control device

The invention claimed is:

1. A car control device, comprising:
a converter and an inverter configured to convert power, which is received by a pantograph and supplied via a transformer, to power for driving a motor;
a first contactor disposed between the transformer and the converter, and a second contactor and a resistor connected in series with each other and in parallel to the first contactor;
a first voltage-dividing capacitor disposed between a positive electrode and a neutral point of a DC circuit between the converter and the inverter;
a second voltage-dividing capacitor disposed between a negative electrode and the neutral point of the DC circuit;
a first voltage detector configured to detect a voltage of the first voltage-dividing capacitor;
a second voltage detector configured to detect a voltage of the second voltage-dividing capacitor; and
a control unit,
wherein the control unit, after controlling the second contactor to be closed, and before controlling the first contactor to be closed, and before outputting a control command to the converter:
calculates a voltage difference between a first voltage value detected by the first voltage detector and a second voltage value detected by the second voltage detector,
compares the voltage difference calculated and a predefined threshold value, and
determines that at least one of the first voltage detector and the second voltage detector malfunctions when the voltage difference is greater than the threshold value as a result of the comparison.

2. A car control device, comprising:
a converter and an inverter configured to convert power, which is received by a pantograph and supplied via a transformer, to power for driving a motor;

a first contactor disposed between the transformer and the converter, and a second contactor and a resistor connected in series with each other and in parallel to the first contactor;
a first voltage-dividing capacitor disposed between a positive electrode and a neutral point of a DC circuit between the converter and the inverter;
a second voltage-dividing capacitor disposed between a negative electrode and the neutral point of the DC circuit;
a first voltage detector configured to detect a voltage of the first voltage-dividing capacitor;
a second voltage detector configured to detect a voltage of the second voltage-dividing capacitor; and
a current detector disposed between the transformer and the converter; and
a control unit,
wherein the control unit, after controlling the second contactor to be closed, and before controlling the first contactor to be closed, and before outputting a control command to the converter:
determines whether a first voltage value detected by the first voltage detector and a second voltage value detected by the second voltage detector satisfy a predefined voltage value,
when determining that the predefined voltage value is satisfied, compares a current value detected by the current detector with a predefined threshold value, and
determines that the current detector malfunctions when the current value is not greater than the threshold value as a result of the comparison.

3. A car control device, comprising:
a converter and an inverter configured to convert power, which is received by a pantograph and supplied via a transformer, to power for driving a motor;
a current detector disposed between the transformer and the converter; and
a control unit,
wherein the control unit:
determines whether a powering command is a maximum level powering command or a rotational speed of the motor is within a constant power range,
when the maximum powering command and the constant power range are detected, compares a current value detected by the current detector with an expected current value that is expected when the maximum level powering command is given and the constant power range is reached, and
determines that the current detector malfunctions when the current value detected by the current detector is not greater than the expected current value as a result of the comparison.

4. A car control device, comprising:
a converter and an inverter configured to convert power, which is received by a pantograph and supplied via a transformer, to power for driving a motor;
a first contactor disposed between a secondary side coil of the transformer and the converter, a second contactor and a resistor connected in series with each other and in parallel with the first contactor;
a first voltage-dividing capacitor disposed between a positive electrode and a neutral point of a DC circuit between the converter and the inverter;
a second voltage-dividing capacitor disposed between a negative electrode and the neutral point of the DC circuit;
a first voltage detector configured to detect a voltage of the first voltage-dividing capacitor;
a second voltage detector configured to detect a voltage of the second voltage-dividing capacitor;
a third voltage detector connected to a tertiary side coil of the transformer; and
a control unit,
wherein the control unit, after controlling the second contactor to be closed, and before outputting a control command to the converter:
calculates an addition value obtained by adding a first voltage value detected by the first voltage detector and a second voltage value detected by the second voltage detector,
calculates a voltage difference between a third voltage value detected by the third voltage detector and the addition value calculated,
compares the voltage difference calculated and a predefined threshold value, and
determines that the third voltage detector malfunctions if the voltage difference is greater than the threshold value as a result of the comparison.

* * * * *